Patented Dec. 15, 1953

2,662,885

UNITED STATES PATENT OFFICE 2,662,885

ANTIHISTAMINE COMPOUNDS

Wilhelm Schuler, Hamburg-Hellbrook, Germany, assignor to Haarmann & Reimer, Chemische Fabrik zu Holzminden G. m. b. H., Holzminden, Weser, Germany No Drawing. Application September 19, 1950, Serial No. 185,697

11 Claims. (Cl. 260—247.5)

It is known that arylamines such as N-phenyl-N-benzyl - aminoethyl - dimethylamine, phenyl-benzyl-methylimidazoline and the like have an anti-histamine action.

It has now been found that substances having an anti-histamine action are produced by converting piperidino-alkyls or their derivatives or substitution products with arylamines or with substitution products of arylamines to substances of the general formula

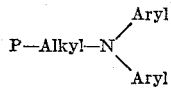

where P is a piperidine or substituted piperidine group "Alkyl" is an alkyl group with less than 10 carbon atoms in the chain and "Aryl" is a phenyl or substituted phenyl group. The alkyl group can include other atoms such as oxygen and sulphur or it can include an amino group. Two different aryl groups can also be attached to the tertiary nitrogen atom, at least one of the aryl groups being attached to the nitrogen atom through an alkyl group. The piperidine or substituted piperidine nucleus may also contain at least one further hetero-atom such as a nitrogen, oxygen or sulphur atom.

In carrying out the present invention one can react a piperidino-alkyl-halogen compound, or the corresponding salt such as the hydrochloride, with an aromatic amine. For example one can treat piperidine in an organic solvent with ethylene chlorhydrin, the mixture being heated gradually to 100° C. over several hours and then boiled under reflux. The hydrochloride salt of the resulting piperidine-ethyl alcohol is treated with thionyl chloride, and the mixture is then heated for some hours. The reaction product is then further reacted with an arylamine, if necessary after decomposition of the hydrochloride by means of a base.

The condensation of the heterocyclic alkyl-halogen compound or of the corresponding hydrochloride with arylamine can be carried out by means of sodium amide, alkali, calcium hydride or finely-distributed sodium metal, preferably in the absence of water and in a water-free solvent. For example the hydrochloride of a heterocyclic alkyl chloride and the appropriate arylamine can be dissolved in nitrobenzene or dioxane and the mixture heated for a long time. One can also produce salts of the hydroazine-alkylamines with inorganic or organic salts. Preferably the salts of ascorbic acid are produced.

The products according to the present invention are advantageously suitable for use as anti-histamine preparations in serum disease, hay-fever, spring dermatitis, urticaria and most of the allergic diseases. They can neutralise or effectively weaken the action of the histamines in the body, so that anaphylactic symptoms are prevented. The new compounds are therapeutically efficient and may be used as pharmaceuticals or intermediates therefor.

The following are examples of the production of anti-histamine compounds in accordance with the invention.

Example 1

250 gm. of piperidine is dissolved in 250 ccm. of absolute toluol and 250 gm. of ethylene chlorhydrin is then added, the reaction mixture at the same time warming up to about 40° C. The mixture is then heated on a water bath to 70° C. and kept at this temperature for half an hour, after which it is kept at 80° C. for half an hour and at 100° C. for one hour. Following this it is boiled for an hour under reflux. On cooling the hydrochloride of the piperidinoethyl alcohol is liberated. The crystals are removed by filtration on a Bücher filter and washed with a little toluol. Evaporation of the filtrate yields a further small amount of the hydrochloride of the piperidino-ethyl alcohol which can be recovered. The total yield is then about 450 gm.

328 gm. of the hydrochloride of the piperidino-ethyl alcohol is slowly mixed with 380 gm. of thionyl chloride. Then 150 gm. of dry chloroform is added and the mixture is then boiled for two hours under reflux. On cooling, the hydrochloride of the piperidino-ethyl chloride is liberated: this is then removed and washed with a little chloroform to give a yield of about 280 gm. of white crystals.

This process has the advantage that the piperidino-ethyl alcohol need not itself be isolated, the hydrochloride being directly converted with thionyl chloride. Thus large deposits can easily be controlled as a cooling with ice is not wanted.

The coupling of the piperidino-ethyl chloride can be done as follows:

The piperidino-ethyl chloride hydrochloride is dissolved in water and ether and a 40% aqueous solution of sodium hydroxide is added gradually. After shaking the ether is separated and the solution is then again shaken with a little fresh ether which is then again withdrawn from the aqueous phase. The combined ethereal shakings are first partially dried with potash, in order to remove most of the water, and then fully dried with sodium sulphate. The ether is first evaporated off and the piperidino-ethyl chloride is then distilled under vacuum. It boils at 47° C. at a pressure of 1 mm. of mercury and is an easily mobile liquid, clear as water, which on storage slowly decomposes with separation of crystals.

1 mol. of benzyl aniline (159 gm.) is dissolved in 100 ccm. of dry toluol, and the solution is placed in a dry apparatus fitted with a stirrer and a reflux condenser. 1 mol. of the piperidino-ethyl chloride (147.5 gm.) is dissolved in 200 ccm. of dry toluol and added to this solution. Then 1.1 mol. (43 gm.) of finely pulverised sodium amide is added. The temperature should not be allowed to rise above 40° C. After one hour the temperature is raised to 60° C., after two hours to 80° C. and after a further two hours to 100° C. The reaction mixture is mixed with water and the toluol layer, which contains the required amine, is then removed, dried with potash and distilled. After the toluol has distilled off, the distillation is continued under vacuum and the piperidino-ethyl-phenyl-benzyl-amine distilled at a pressure of 3 mm. of mercury and at a temperature between 210 and 218° C. The distillate is a light-yellow oil, which hardens over night. The yield is about 78%.

The resulting piperidino-ethyl-phenyl-benzyl-amine is then dissolved in 1000 ccm. of hot N-hydrochloric acid, the few drops of oil remaining undissolved being easily removed by means of active carbon. The neutral hydrochloride of the piperidino - ethyl - phenyl - benzylamine, which melts at 206° C., crystallises out on cooling.

Example 2

1 mol. of piperidine (85 gm.) is placed in a container and 1 mol. of ethyl oxide (44 gm.) is added. The mixture is then heated for 1 hour at 100° C.; the resulting product is distilled; and the piperidino-ethyl alcohol distilling at between 195–197° C. is collected. The yield is about 75% of the theoretical value.

The piperidino-ethyl alcohol thus obtained can, according to Prelog, be reacted in known manner with thionyl chloride (the reaction being cooled with ice at the start) to give the hydrochloride of the piperidino-ethyl chloride.

The hydrochloride of the resulting piperidino-ethyl chloride is then dissolved in a little water and toluol added. The base is then liberated by shaking with sodium hydroxide. The toluol layer is then separated, removed and dried with sodium sulphate and then further reacted with benzyl aniline.

The condensation with benzyl aniline can be carried out in the presence of powdered sodium metal, sodium amide, sodium hydride, calcium hydride and other alkali or light metals or their hydrides or amides.

The condensation can also be carried out so that the piperidino-ethyl chloride hydrochloride can be directly reacted with benzyl aniline in toluol. In such case 2 mol. of sodium amide per mol. of piperidino-ethyl chloride hydrochloride is necessary for the condensation.

It has also been found that the piperidino-ethyl chloride hydrochloride can be reacted with benzyl aniline in a suitable solvent and at higher temperatures to give the corresponding piperidino-ethyl-phenyl-benzylamine. Nitrobenzene, for example, is a suitable solvent, though in such case the temperature should not be increased too much, because above 150° C. the oxydising properties of the nitrobenzene itself has a disturbing effect owing to decomposition and green colouring of the reaction product.

The neutral hydrochloride salt of the piperidino-ethyl-phenyl-benzylamine is suitable for use as tablet substance, which has the following composition formula:

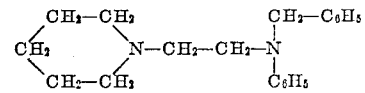

The solubility in water is rather slight for intravenous and intramuscular injection. However, it has been found that the ascorbinate of the piperidino-ethyl-phenyl-benzylamine is readily soluble in water and is especially suitable for injection.

The piperidino - ethyl - phenyl - benzylamine shows a surprisingly good anti-histamine effect with excellent compatability without arresting the formation of anti-bodies.

According to the invention other similar derivatives can also be used, such as N-dibenzyl-methyl-ethylene - diamine; N,N'-bis-(dibenzylmethyl)-ethylene-diamine; N-dibenzyl-methyl - ethanolamine; piperidino - isopropyl - phenyl - benzylamine; piperidino-ethyl-diphenylamine; morpholino - ethyl - diphenylamine; piperidino - ethyl-benzyl ether; piperidino - ethyl - phenyl-propyl ether; and the like. The production of substances such as piperidino-ethyl-benzyl ether and piperidino-ethyl-phenyl-propyl ether can be carried out simply by reacting the sodium salt of the piperidino-ethyl alcohol with benzyl chloride or phenyl-propyl chloride in boiling toluol. The yield is about 65% of the theoretical.

I claim:

1. The process which comprises reacting, in the presence of a condensing agent, a secondary amine of the formula

where C and D are each members of the group consisting of aryl and aralkyl radicals of the benzene series, with a member of the group consisting of compounds having the formula (>N-alkyl-halogen and their acid salts, where (>N is a saturated azine radical from the group consisting of piperidino and morpholino, and alkyl is a divalent alkyl radical having less than ten carbon atoms in the chain, the said condensing agent comprising a substance from the group consisting of the alkali metals, alkali metal amides, alkali metal hydrides and alkaline earth hydrides.

2. A process as in claim 1, wherein the condensation reaction is carried out in a water free organic solvent.

3. A process as in claim 1, wherein the condensation reaction is carried out in a water free organic solvent from the group consisting of nitrobenzene, toluol and dioxane.

4. A process as in claim 1, wherein the (>N is a piperidine radical, C is a benzyl radical and D is a phenyl radical.

5. A process as in claim 1, wherein the (>N is a piperidine radical, C is a benzyl radical, D is a phenyl radical, and alkyl is an ethylene group.

6. A process as in claim 1, wherein the (>N is a morpholine radical, and C and D are both phenyl radicals.

7. A process as in claim 1, wherein the (>N is a piperidine radical and C and D are both phenyl radicals.

8. A process as in claim 1, wherein the secondary amine is an aniline compound and wherein the (>N-alkyl-halogen is a piperidine-ethylene chloride compound.

9. A process as in claim 1, wherein the secondary amine is benzyl aniline and the compound is a hydrochloride of piperidino-ethyl chloride.

10. The method of producing piperidino-ethyl-phenyl-benzylamine which comprises dissolving a compound from the group consisting of piperidino-ethyl chloride and the hydrochloride salt thereof in substantially dry toluol, adding to the toluol solution benzyl aniline, and sodium amide, effecting the condensation reaction under controlled temperature conditions including a rise to a temperature not in excess of 40° C. for approximately one hour, then heating to approximately 60° C. for substantially two hours, and finally heating to a temperature of approximately 100° C. for substantially two hours, adding water to the reaction mixture, removing the toluol layer, and distilling off the toluol.

11. The method as in claim 10 wherein the piperidino-ethyl-phenyl-benzylamine is dissolved in an acid from the group consisting of hydrochloric acid and ascorbic acid and crystallizing the acid salt of piperidino-ethyl-phenyl-benzylamine from the acid solution.

WILHELM SCHULER.

References Cited in the file of this patent

UNITED STATES PATENTS

| Number | Name | Date |
|---|---|---|
| 2,087,506 | De Groot | July 20, 1937 |
| 2,163,181 | Ulrich et al. | June 20, 1939 |
| 2,213,977 | Christiansen | Sept. 10, 1940 |
| 2,419,230 | Ruskin | Apr. 22, 1947 |
| 2,433,688 | Fox et al. | Dec. 30, 1947 |
| 2,502,151 | Horclois | Mar. 28, 1950 |
| 2,505,133 | Miescher et al. | Apr. 25, 1950 |

OTHER REFERENCES

Eisleb, Ber. der Deut. Chemie, vol. 74B (1941), pp. 1433–1450.